Figure 1:
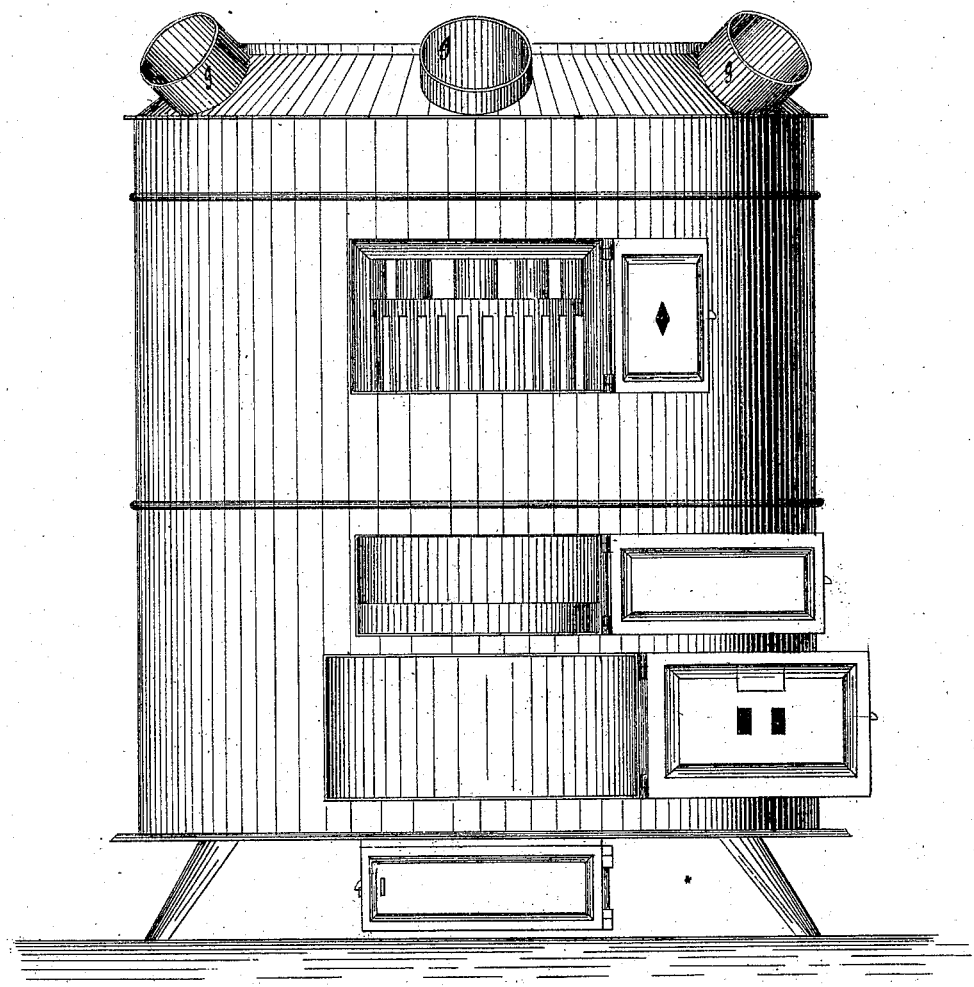

C. ALLEN.
Hot Air Furnace.

No. 111,027.

5 Sheets—Sheet 1.

Patented Jan. 17, 1871.

Witnesses

Inventor
Charles Allen

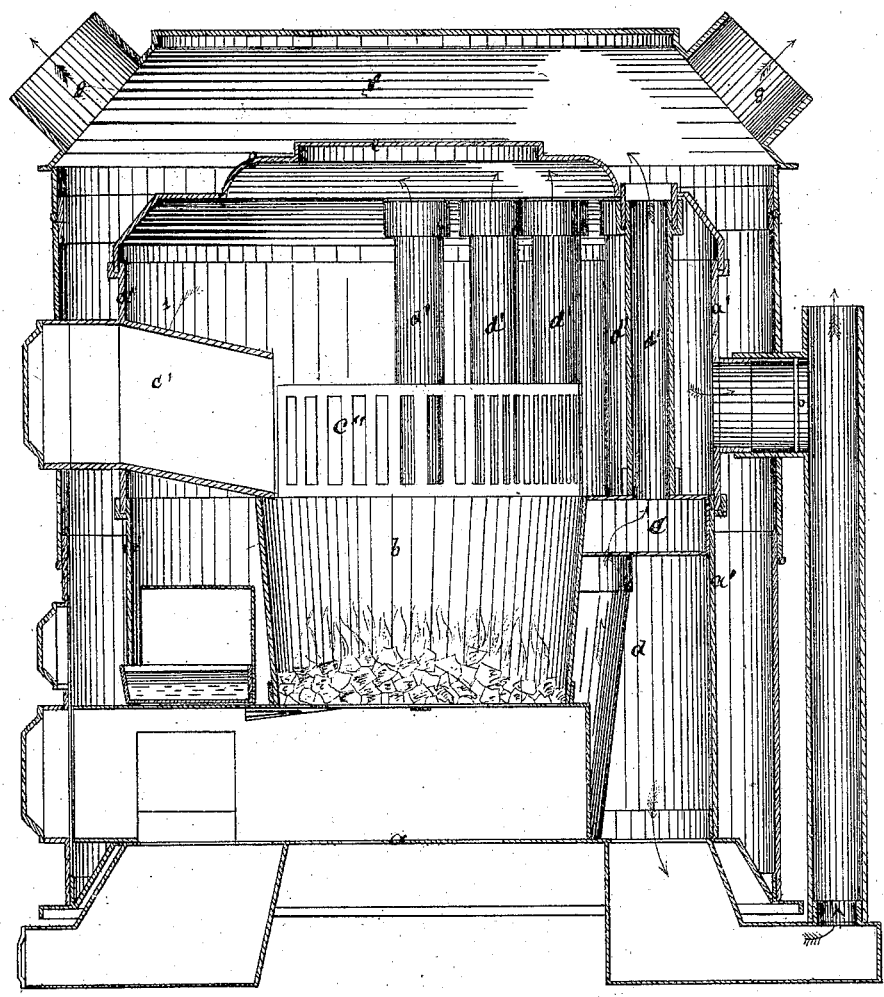

C. ALLEN.
Hot Air Furnace.
No. 111,027.
5 Sheets—Sheet 3.
Patented Jan. 17, 1871.
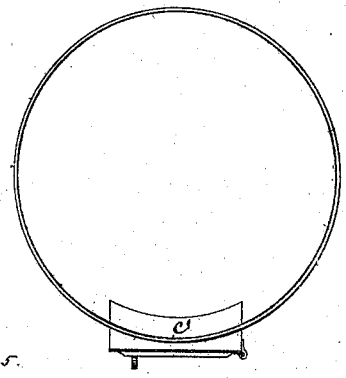
Fig. 5.
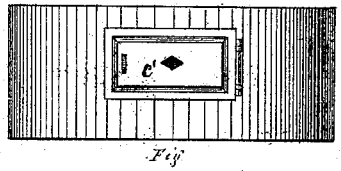
Fig. 3.
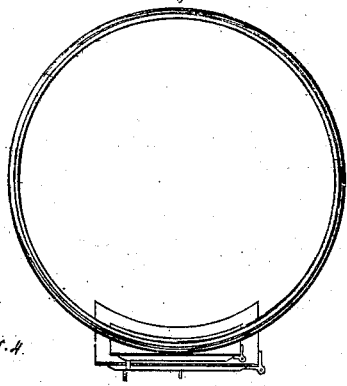
Fig. 4.
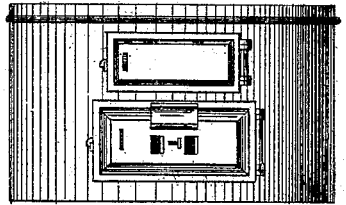
Witnesses
E. W. Bliss,
Jeremy W. Bliss
Inventor.
Charles Allen C. ALLEN.
Hot Air Furnace.
No. 111,027.
5 Sheets—Sheet 4.
Patented Jan. 17, 1871.
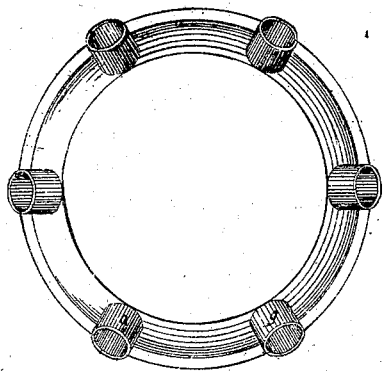
Fig. 7.
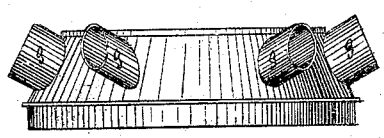
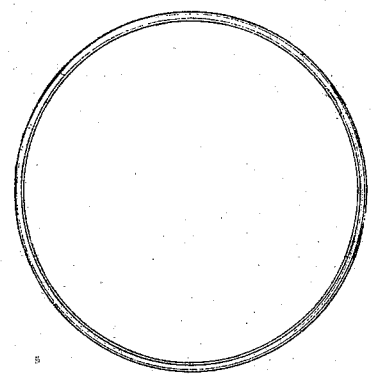
Fig. 6
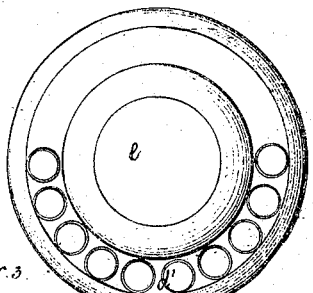
Fig. 3
Witnesses
Inventor
Charles Allen C. ALLEN.
Hot Air Furnace.
No. 111,027.
5 Sheets—Sheet 5.
Patented Jan. 17, 1871.
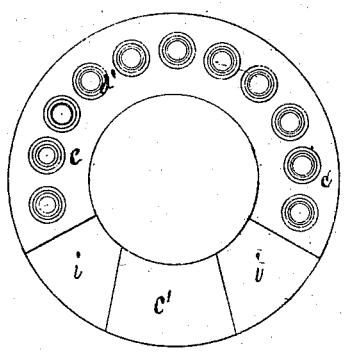
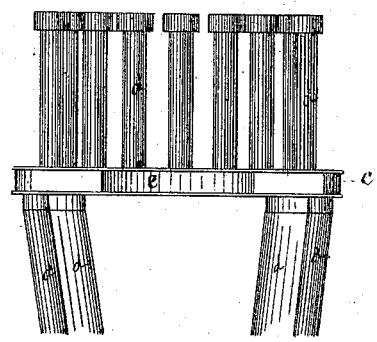
Fig. 8.
Witnesses.
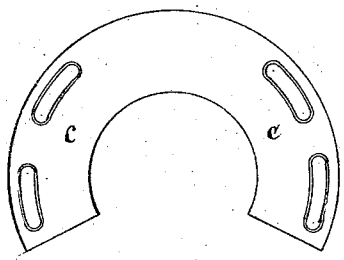
Inventor.
Charles Allen

UNITED STATES PATENT OFFICE.

CHARLES ALLEN, OF HARTFORD, CONNECTICUT.

IMPROVEMENT IN HOT-AIR FURNACES.

Specification forming part of Letters Patent No. 111,027, dated January 17, 1871.

*To all whom it may concern:*

Be it known that I, CHARLES ALLEN, of the city and county of Hartford and State of Connecticut, have invented certain new and useful Improvements in Hot-Air Furnaces; and to enable others skilled in the art to make and use the same, I will proceed to describe, referring to the drawings, in which the same letters indicate like parts in each of the figures.

The nature of this invention consists in arranging an air-chamber within the combustion-chamber and around the upper edge of the fire-pot, so that it shall occupy all the space between the fire-pot and the wall of the combustion-chamber except the space occupied by the feed-hopper and downward-draft space formed each side of the feed-hopper, and supported in its proper place (the air-chamber) by air-conducting tubes from the base-plate of the furnace, and also in providing and arranging a series of air heating and conducting tubes extending from the upper side of said air-chamber to the cap of the combustion-chamber, thus confining the direct heat in the chamber above the fire-pot, except as it passes downward through the draft-openings between the ends of the air-chamber and the sides of the feed-hopper into the lower chamber within the same wall, around the fire-pot, and expending itself (the heat) upon the air-induction tubes and the under side of air-chamber, which divides the upper and lower heating-chambers before the smoke and gases escape through the exit-orifice formed in the base-plate of the furnace.

In the accompanying drawings, Figure 1 is a front elevation showing very little but the outside shell, formed of masonry or sheet metal, and incloses the furnace proper. This shell or wall does not enter into or form any part of this invention. Fig. 2 is a sectional view of the entire furnace. Figs. 4, 5, 6, 7 show detached side and top views of the wall or case which incloses the furnace. Fig. 8 shows a front elevation of the air-heating and air-conducting apparatus removed from the combustion-chamber. Fig. 3 shows a side and top view of the bonnet which covers the upper end of the air-tubes and the combustion-chamber.

$a$ is the base or bottom of the furnace.

$a'$ is the case or wall of the combustion-chamber, and incloses the fire-pot $b$ and the air heating and conducting tubes. (See Fig. 8.)

$c$ is an air-chamber, which is circular or segmental in form, and occupies about three-fourths of the space between the fire-pot and wall of the combustion-chamber, thereby allowing a downward-draft space at or between each end of the air-chamber $c$ and the sides of the feed-hopper $c'$, as indicated by dart 1.

$c''$ is a fender arranged on the upper side of the air-chamber $c$, to prevent the fuel from falling back between the air-tubes $d'$ or down the draft-openings each side of the feed-hopper. The depth of the air-chamber $c$ is more or less, as desirable. Its upper side is arranged about flush with the upper edge of the fire-pot, and is connected with and supported in its place by the air-induction tubes $d$ from the base-plate $a$.

$d'$ are air-conducting and air-heating tubes arranged in a perpendicular position around the fire-pot, and upon the upper side of the air-chamber $c$, and extending upward to the flange-openings in the cap $e$. Thus the air is introduced into and passes through the furnace, through the base-plate, by the tubes $d$, into the chamber $c$, arranged in the space around the fire-pot, thence through the tubes $d'$ into the hot-air chamber $f$ of the furnace, thence through the pipes $g$ (more or less in number) into the several apartments. The construction of this air conducting and heating apparatus arranged inside of the combustion-chamber will be clearly seen and more fully understood by reference to Fig. 8. The grate, doors, smoke-exit, and all of the exterior work are constructed much the same as in those in common use.

I believe I have thus shown the nature, construction, and advantage of this invention so as to enable others skilled in the art to make and use the same.

What I claim, and desire to secure by Letters Patent, is—

The chamber $c$, arranged between the fire-pot $b$ and the shell $a'$, in combination with the induction-tubes $d$ and heating-tubes $d'$, and draft-passages $i$ each side of the feed-hopper, as shown and set forth.

CHARLES ALLEN.

Witnesses:
  E. W. BLISS,
  JEREMY W. BLISS.